United States Patent [19]

Rendel

[11] 4,455,449
[45] Jun. 19, 1984

[54] UNIVERSAL HIGH/LOW VOLTAGE KIT FOR JUNCTION WIRING BOX

[75] Inventor: Robert D. Rendel, St. Charles County, Mo.

[73] Assignee: Emerson Electric Co., St. Louis, Mo.

[21] Appl. No.: 358,253

[22] Filed: Mar. 15, 1982

[51] Int. Cl.³ .............................................. H02G 3/08
[52] U.S. Cl. ...................................... 174/53; 220/3.8; 220/22
[58] Field of Search ............................ 174/53, 48, 49; 220/3.2–3.94, 22

[56] References Cited

U.S. PATENT DOCUMENTS

| | | | |
|---|---|---|---|
| 2,092,367 | 9/1937 | Breitenstein | 220/3.94 |
| 3,587,906 | 6/1971 | Pepe | 174/53 X |
| 3,932,696 | 1/1976 | Fork et al. | 174/48 |
| 4,096,347 | 6/1978 | Penczak et al. | 174/48 |
| 4,178,469 | 12/1979 | Fork et al. | 174/48 |

*Primary Examiner*—J. V. Truhe
*Assistant Examiner*—D. A. Tone
*Attorney, Agent, or Firm*—Polster, Polster and Lucchesi

[57] ABSTRACT

A kit is disclosed which is installable in a wiring junction box so as to adapt the box to receive high and low voltage wiring from high and low voltage sources and high and low voltage wiring from an appliance, and to permit the connection of the high and low voltage connections within the box being physically separated from one another. The kit comprises a partition installable within the box so as to divide the interior of the box into a high voltage compartment and a low voltage compartment. A cover is provided for closing the open front face of the box, this cover including a first cover plate securable to the box to overlie only a portion of the box bottom. The cover assembly further includes a second cover plate removably installable on the box after the wiring connections have been made within the box thereby to permit inspection of the wiring connections without disturbing the wiring within the box.

5 Claims, 9 Drawing Figures

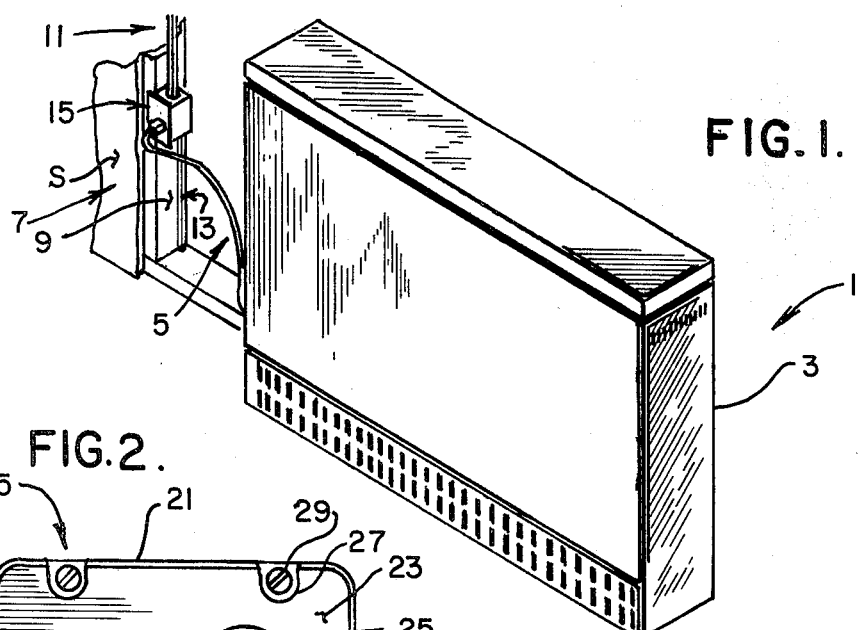
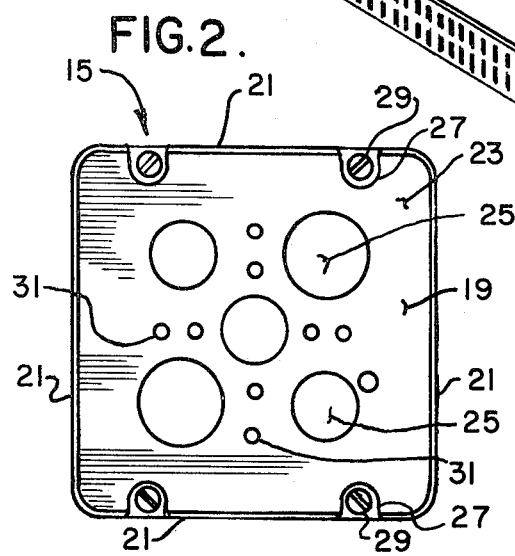
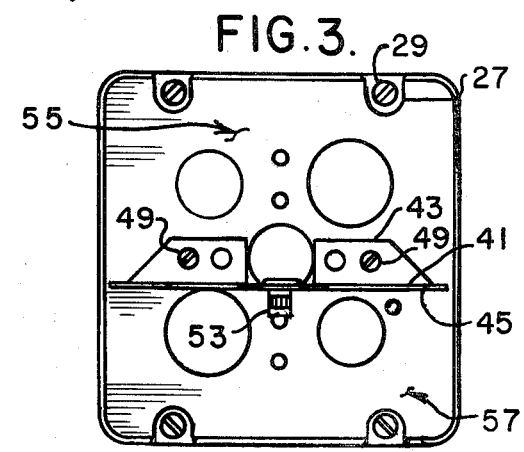
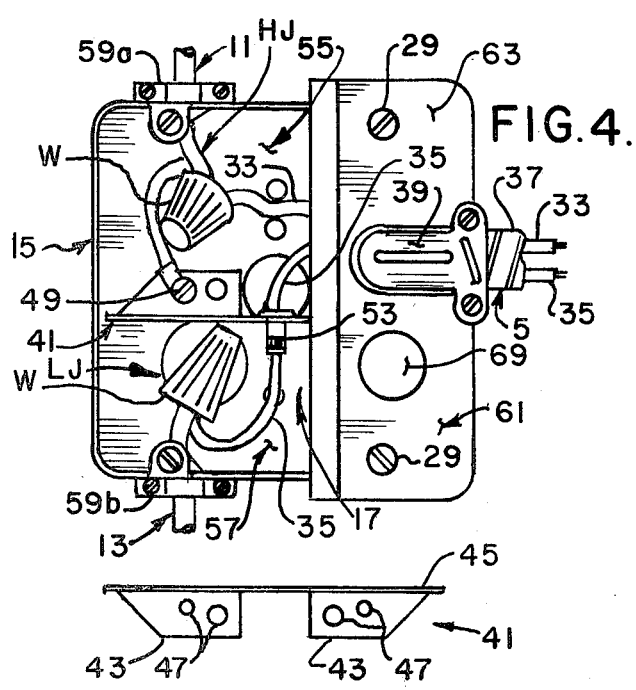
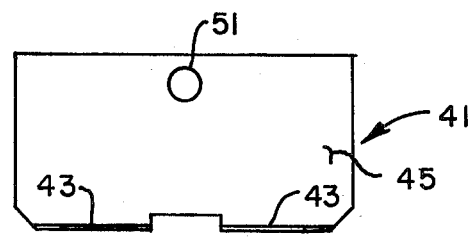

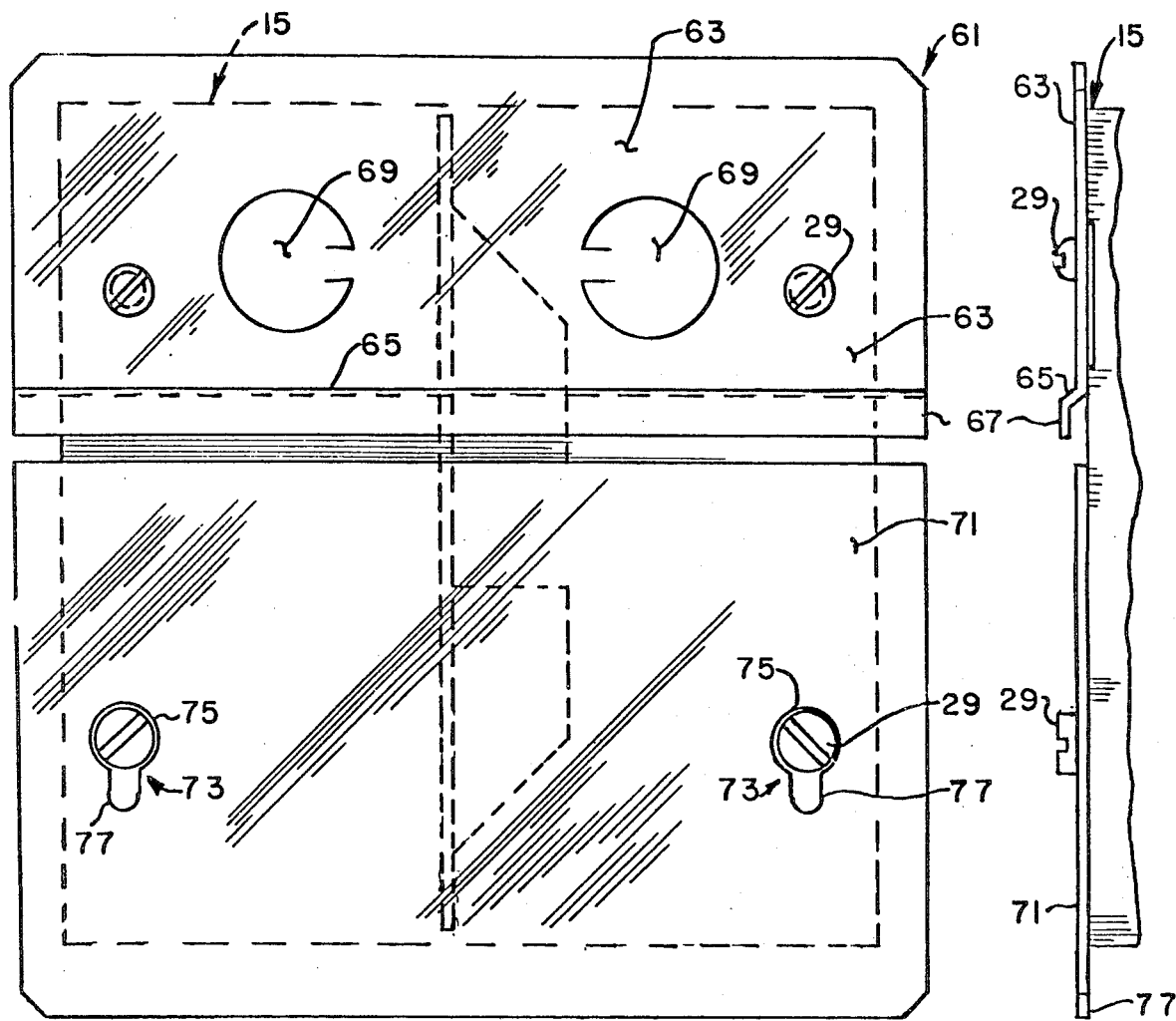
FIG. 8.
FIG. 9.
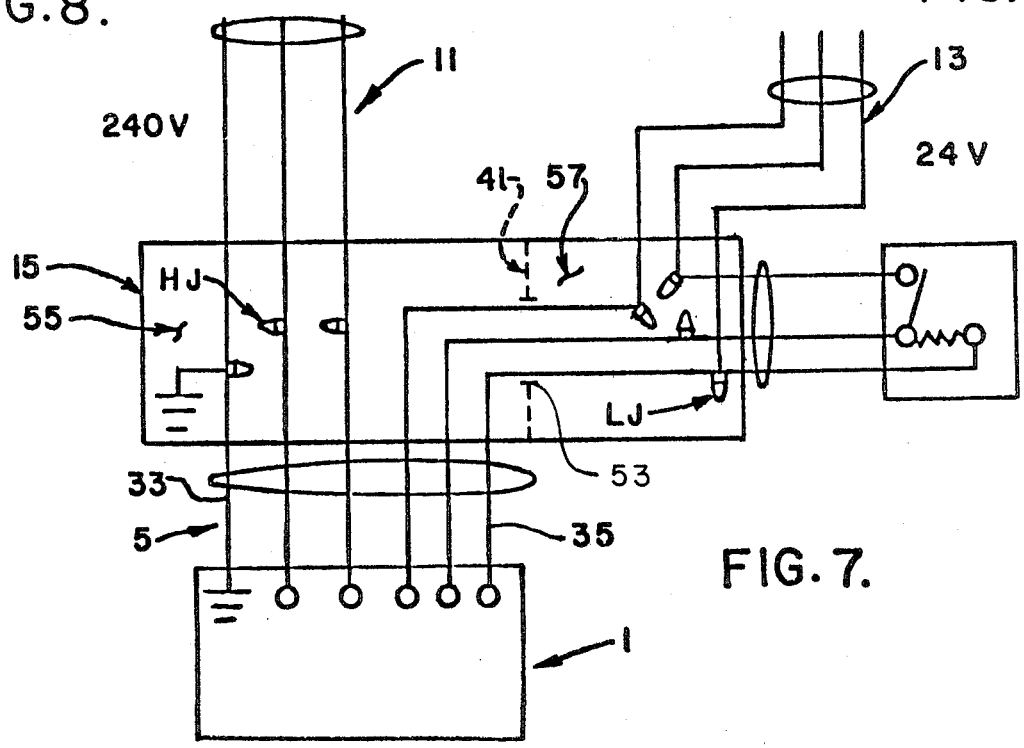
FIG. 7.

UNIVERSAL HIGH/LOW VOLTAGE KIT FOR JUNCTION WIRING BOX

BACKGROUND OF THE INVENTION

This invention relates to a universal kit installable in an electrical junction wiring box so as to permit the connection of high and low voltage wiring within the box with the low voltage junctions physically separated from the high voltage junctions.

In connecting certain electrical appliances, such as electric storage heaters and the like, to the wiring of a building, care must be taken to ensure that the wiring conforms to electrical wiring standards and codes, such as established by the National Electric Code (NEC), by Underwriters' Laboratories (U.L.), or by ordinance. More specifically, an electrical storage heater typically has line voltage (e.g., 240 volts) wiring supplying electrical resistance heaters therewithin and low voltage control wiring connecting switch controls with a remote master control panel. The high and low voltage wiring in the heater and the building high voltage wiring is normally specified to have a high voltage electrical insulation material thereon, referred to as a Class I-type insulation, while the building low voltage wiring typically has a low voltage electrical insulation thereon, this low voltage insulation being referred to as Class II-type insulation.

As previously mentioned, various electrical codes require that the high voltage and low voltage junctions be physically separate from one another. For the installation of an electric storage heater in a newly constructed or remodeled building, the requirement of physically separating the high and low voltage junctions may be done in either of two ways. First, the building contractor may provide two separate electrical junction boxes in the wall of the building. One of these junction boxes would be for the purpose of housing the junctions of the high voltage electrical supply wiring installed in the building to the high voltage appliance wiring. The other junction box would be for the purpose of housing the junctions between the low voltage control wiring already installed in the building and the low voltage control wiring from the appliance. Alternatively, a single electrical junction box may be installed which has a partition dividing the junction box into a high voltage compartment and a low voltage compartment.

However, in comparing total installed costs, it is a distinct disadvantage to the appliance manufacturer if the building contractor must, during construction of the building, provide two junction boxes as extra costs and labor are required to install two separate junction boxes. The requirement of two separate boxes also requires the appliance manufacturer or builder to provide separate high and low voltage wiring harnesses between the appliance and the two junction boxes.

Junction boxes are known which accept a partition, which will to divide the junction box into a high voltage chamber and a low voltage chamber. These junction boxes for which partitions are available are commonly referred to in the electrical trade as gang boxes, masonry boxes, and tile wall boxes. These boxes are normally used in only some of the types of building construction where electrical appliances are installed. Further, the partitions for these boxes are not provided with a passageway whereby wires in one chamber may pass into another chamber through the partition. This shortcoming requires that there be separate high and low voltage wiring harnesses from the appliance to the junction box in order for the wires to enter their respective compartments formed by the partition in the junction box.

Further, these partitions are generally manufactured by a particular manufacturer to fit its particular box. There are relatively few (less than half a dozen) manufacturers of junction wallboxes. Oftentimes, the manufacturer of the junction wallbox would not be known until such time as the electrician attempts to install the electrical appliance. It would be a distinct disadvantage to an electrical appliance manufacturer if it had to supply low voltage partitions with his appliance adapted to fit each of the junction boxes of the various common junction box manufacturers.

Also, because electrical storage heaters are relatively new on the market, many building designers and electrical contractors are seeking the most cost effective way to comply with the electrical codes requiring the high voltage and low voltage electrical junctions to be physically separated from one another. It is important in marketing electrical appliances that provisions be made that enable the installers of the appliances to readily comply with the applicable electrical codes in the most economical manner.

Thus, there has been a need for a universal kit supplied with an electrical appliance that could be used with any common junction box of a common size (for example, for use with a 4 11/16ths inch square by 2⅛th inch deep electrical box) supplied by any junction box manufacturer. This universal kit would by design overcome all of the aforementioned shortcomings and cost penalties. Further, this universal kit would have all of the features described in the description of the present invention.

SUMMARY OF THE INVENTION

Among the several objects and features of the present invention may be noted the provision of a universal kit to be supplied with an electrical appliance, such as an electric storage heater, for adapting a common junction wiring box so as to comply with established electrical codes which require the high voltage and low voltage junctions to be physically separated from one another when connecting the appliance wiring to the already installed building wiring;

The provision of such a kit which is universal for all commonly available junction wiring boxes of a given size;

The provision of such a kit or a junction wiring box which is easy to use because it permits the appliance wiring to be securely fastened to the junction box before the electrical connections are made within the junction box thereby freeing the installer's hands to make the electrical connections within the box;

The provision of such a kit or of a junction box in which a cover for the box may be readily installed on the junction box after the electrical connections within the junction box have been made thereby facilitating inspection of the junctions without physically disturbing the wiring within the box;

The provision of such a kit in which a partition divides the box into two wiring compartments with an opening in the partition which permits wires to pass through it; and The provision of such a kit which is of simple and economical construction, which is of compact size, and which is simple to install.

Other objects and features of this invention will be in part apparent and in part pointed out hereinafter.

Briefly stated, a universal kit of this invention is installable in an electrical junction box so as to adapt the box to receive both high and low voltage wiring from respective high and low voltage source and high and low voltage wiring from an appliance, to permit the connection of the high voltage wiring from the high voltage power source to the high voltage appliance wiring, and to permit the connection of the low voltage wiring from the low voltage power source to the low voltage appliance wiring with the high and low voltage connections being physically separate from one another. The box has a bottom and sides extending up from the bottom and has an open front face. The sides and/or bottom of the box have a plurality of knock-out plates therein so as to permit the entry into the box of the high and low voltage wiring from the high and low voltage power sources. The kit comprises a partition installable within the box so as to divide the interior of the box into a high voltage compartment and a low voltage compartment. The partition has a passageway through it which permits the low voltage appliance wires (with Class I insulation rating) to pass from the high voltage compartment to the low voltage compartment. The kit further includes a cover for closing the open front face of the box, this cover including a first cover plate securable to the box having at least two knock-out plates therein so as to permit the entry into the box of the high and low voltage wiring from the appliance through a single wiring cable with the two knock-outs assuring there is always one knock-out overlying the high voltage compartment and a second cover removably installable on the box after the wiring connections have been made within the box thereby to permit inspection of the wiring connections without disturbing the wiring within the box

BRIEF DESCRIPTION OF THE DRAWINGS

FIG. 1 is a perspective view of an electrical appliance, such as an electric storage heater, having a power supply cable electrically connected to wiring in the wall of a building with the electrical connections being housed within an electrical junction box and with this electrical junction box being provided with a universal kit of the present invention for physically separating high voltage and low voltage wiring junctions from one another within the electrical junction box;

FIG. 2 is a front elevational view of a common electrical junction box;

FIG. 3 is a view similar to FIG. 2 illustrating the installation of a partition comprising a portion of the universal kit of the present invention with the partition physically dividing the interior of the junction box into a first or high voltage compartment and a second or low voltage compartment;

FIG. 4 is a view similar to FIG. 3 illustrating the installation of the stationary portion of the cover of the present invention having the wiring harness from the appliance secured to the cover and entering a selected knock-out opening via a strain relief fitting and further illustrating the connection of high and low voltage building wiring to high and low voltage wiring from the appliance with the high and low voltage junctions being physically separated by the partition;

FIG. 5 is a top plan view of the partition;

FIG. 6 is a front elevational view of the partition;

FIG. 7 is an electrical schematic of the connections of the high and low voltage building wiring connected to the high and low voltage appliance wiring within a junction box utilizing a kit of the present invention;

FIG. 8 is a front elevational view of a junction box (shown in an enlarged scale) rotated 90° in counter clockwise direction from the box shown in FIG. 4 having a cover assembly of the present invention installed thereon, the cover assembly including a stationary cover and a slidable cover moveable from a retracted position (as shown) in which it may be readily applied to or removed from the junction box and an installed position in which the stationary cover cooperates with the slidable cover thereby to securely fasten the movable cover in place on the junction box, the strain relief fitting shown secured to the stationary cover of FIG. 4 being omitted for clarity; and FIG. 9 is a side elevational view of the cover assembly shown in FIG. 8.

Corresponding reference characters indicate corresponding parts throughout the several views of the drawings.

DESCRIPTION OF THE PREFERRED EMBODIMENT

Referring now to the drawings, and more particularly to FIG. 1, a storage heater electrical appliance is indicated in its entirety by reference character 1. This storage heater comprises an insulated cabinet 3 in which are enclosed one or more electrical resistance heating elements (not shown) and a stack of heat absorbing, heat storing members, such as suitable refractory bricks. In operation, the electrical resistance heating elements are energized during off-peak hours (e.g., at night) when utility rates are lower or when the electrical demand for a business is lower thereby lowering the demand charges to the business. Typically, such a storage heating system would be utilized in a building having a dual register electric watt-hour meter which records off-peak power consumption so that the customer is charged a lower amount for power consumed during the off-peak hours.

The operation of the electric heater is typically controlled by a control center (not shown) located centrally within the building, this control center controlling the operation of a number of storage heater units 1, such as shown in FIG. 1, distributed throughout the building. The control center typically has an outdoor sensor which relays weather conditions to the control center. The control center determines the level of heating charge required (less in mild weather, more in cold weather) and energizes the heating elements in the various storage heating units under its control during the off-peak periods so that each of the heating units will have an adequate charge of heat to adequately heat the rooms in which they are located during the following day. A room thermostat is provided for each of the storage heater units which cycles a fan (not shown) within the storage heater unit 1 thereby to distribute stored heat from the storage heater thus maintaining the room at a desired temperature.

Conventionally, the storage heater 1 is installed in a room adjacent a wall 7 and is supplied power by means of a power supply 11 and control cable 13. As illustrated in FIG. 1, wall 7 is constructed in accordance with conventional building construction techniques and has a stud framework 9 therewithin. A sheathing material S, such as drywall, covers the wall framework 9 in the conventional manner.

As indicated at 11, conventional 240 volt wiring is provided within wall 7. Additionally, 24 volt control wiring 13 is routed in the house from the control center to the location of each of the storage heater units 1. Typically, both the 240 volt power supply wiring 11 and the 24 volt house control wiring 13 installed in the building has a low temperature electrical insulation (60° C.) thereon. The high voltage and low voltage house wiring 11 and 13 are routed to a junction box, as generally indicated at 15, which is modified by utilizing a kit 17 in accordance with the present invention so as to convert the conventional junction box into a dual compartment junction box having a low voltage compartment (Class II) and a high voltage compartment (Class I) so that the high and low voltage electrical connections are physically separated from one another, as required by various electrical wiring codes and regulations.

More specifically, junction box 15 is a conventional junction box of a common size formed of sheet metal or the like secured to stud 9 of wall 7. These junction boxes may be manufactured by any one of a variety of different manufacturers, but all of the junction boxes manufactured by the various manufacturers of a common size have essentially the same exterior and interior dimensions and are used interchangeably. Here, the junction box is a common 4 11/16 inch square ×2⅛ inch deep electrical box which is secured to a wall stud 9 in the wall behind the planned location of storage heater 1 with the open front face of the box facing outwardly into the room. Preferably, the junction box is located about 12 inches above floor level. For example, one typical junction box is manufactured by Raco of South Bend, Ind. and is sold under the manufacturer's catalog numbers 255 through 259 or 265 through 268. While all of the wallboxes of a particular size have generally the same dimensions, the location of knockout plates and mounting holes vary, depending on the manufacturer. However, in accordance with this invention, kit 17 may be utilized so as to readily convert any of the conventional wallboxes of a specified size into a two-compartment high and low voltage wallbox so that the connections can be made from the high and low voltage house wiring 11 and 13 to the high and low voltage wiring harnesses within storage heater cable 5.

Generally, regardless of the identity of the manufacturer of wallbox 15, the wallbox includes a bottom plate 19, four side walls 21 extending up from the bottom, and an open front face 23. A plurality of knock-out plates 25 (i.e., areas of weakness which may be readily broken away from the wallbox so as to route wiring therethrough) are provided in the bottom and sidewalls of the junction box. In addition, junction box 15 is typically provided with a plurality of tabs 27 having threaded openings therein into which screws 29 may be threaded so as to secure a cover plate in place on the open front face of the junction box. Also, in the bottom plate and sidewalls of the junction box, a plurality of mounting holes 31 is provided enabling the junction box to be readily secured to a wall stud 9. It will be understood that the size and the location of mounting holes 31 in bottom 19 and sidewalls 21 may vary, depending on the manufacturer of the junction box.

Heater cable 5 includes a wiring harness therewithin having high voltage wiring 33 and low voltage control wiring 35. The high and low voltage storage heater wiring 33 and 35 is covered with a high voltage electrical insulation material, generally referred to as Class I insulation. The use of high voltage insulation on the low voltage wires 35 permits these wires, by code, to occupy the same cable. The advantage gained is that all the heater wires enter the junction box at one point, namely the high voltage compartment, which allows the use of only one heater wiring harness. Further, the storage heater cable includes an armored, flexible conduit 37 in which the wiring harness is sheathed. A right-angle strain relief fitting 39 is secured to the free end of the conduit so that heater cable 5 may be fixedly secured to stationary cover 61 in a manner as will hereinafter be described.

Of course, the function of junction 15 is to house the free ends of the house wiring 11 and 13 and the free ends of the storage heater wiring harness wiring 33 and 35 so that electrical junctions between the house and storage heater unit high and low voltage wiring may be made and so that these electrical junctions are protected as they are installed within the wall 7. Because of the strain relief fitting 39 provided on storage heater cable 5 and because junction wiring boxes are typically provided with strain relief clamps (as will be hereinafter described) for securing the house wiring to the junction box, the junction box positively prevents undue strain from being placed on the junctions between the wiring which are made within the box. Thus, the box protects the junctions and helps to prevent loosening of the wiring connections.

However, certain electrical codes have been formulated which, in effect, require the high voltage junctions HJ and low voltage junctions LJ to be physically separate from one another. Thus, in order to conform with these electrical wiring standards, the high voltage junctions between house wiring 11 and high voltage storage heater unit wiring 33 and the low voltage junctions between house control wiring 13 and storage heater low voltage control wiring 35 must be physically separate from one another within junction box 15.

In order to accomplish this, kit 17 includes a partition 41 (see FIGS. 5 and 6) which is readily installable on bottom wall 19 of junction box 15. This partition includes a pair of legs 43 adapted to bear against the inside face of bottom wall 19 and a wall 45 extending perpendicularly from the legs. Legs 43 each have a plurality of mounting holes 47 provided therein which are so spaced on the legs as to mate with at least one and preferably with two or more of the mounting openings 31 provided in the bottom wall 19 of junction box 15, regardless of the manufacturer of the particular junction box used. In other words, partition 41 will universally fit all conventional junction boxes of a specified common size. Screws 49 may be inserted in mounting holes 47 so as to mate with mounting openings 31 in the junction box thereby to rigidly secure partition 41 in place within the interior of the box. Typically, kit 17 includes a plurality of screws 49 of various sizes so, regardless of the manufacturer of the box in which the kit is to be installed, screws 49 will fit the apertures 31. An aperture 51 is provided in wall 45 and an anti-abrasion grommet 53, preferably of electrical insulation material, is fitted within aperture 51.

In this manner, partition 41 divides the junction box 15 into a first or high voltage compartment, as generally indicated at 55, and into a second or low voltage compartment, as generally indicated at 57. As heretofore disclosed and as shown in FIG. 4, junction box 15 is provided with a pair of conventional clamp-type strain relief fittings 59a, 59b for securing high voltage house wiring 11 to one sidewall 21 of the junction box and for securing the low voltage house control wiring 13 to another sidewall of the junction box as the wiring 11 and 13 passes through respective knock-out openings 25 in their respective sidewalls for entrance into their respective high and low voltage compartments.

Also as shown in FIG. 4, strain relief fitting 39 for storage heater cable 5 is secured to the stationary cover 63 of kit 17 and the high and low voltage storage heater wiring 33 and 35 is routed via a common knockout opening 69 in stationary cover 63 into the interior of the high voltage compartment 55. In accordance with this invention, low voltage control wire 35 from the storage heater is routed through aperture 51 in partition wal 45 and is protected from abrasion by the edges of aperture 51 by grommet 53. Stationary cover 63 with heater cable 5 attached to it via fitting 39 is now mounted securely to box 15 with screw 29 as will be described in greater detail hereinafter. The conductors of high voltage house wiring 11 and of high voltage storage heater wiring 33 are electrically connected to one another to form a respective high voltage junction HJ and are positively secured together in electrical contact with one another by a wirenut W in a conventional manner. Likewise, low voltage house control wiring 13 and low voltage storage heater wiring 35 are electrically joined together to form a respective low voltage junction LJ and the conductors of the wire are positively secured together by a respective wirenut W. It will be seen in FIG. 4 that the high and low voltage junctions HJ and LJ are separated from one another by partition 41. With the high and low voltage junctions physically separated from one another, this single junction box has been converted into a dual compartment junction box and thus enabling the connection of the high and low voltage storage heater wiring to the high and low voltage house wiring to be made in conformance to generally recognized electrical wiring codes and regulations.

Further in accordance with this invention, after junctions HJ and LJ have been made within the wiring box 15, as described above, a removable cover, as generally indicated at 71 (see FIGS. 8 and 9), may be installed on junction box 15 so as to close the open front face of the box after the junctions have been made without physically disturbing the junctions. This removable cover permits the ready inspection of the junctions within both the high and low voltage compartments 55 and 57 of the junction box without disturbing the junctions. More specifically, cover assembly 61 comprises a stationary cover 63 which overlies a portion of both the high and low voltage compartments 55 and 57 of the junction box and, as shown in FIG. 4, partition 41 is generally perpendicular to the longitudinal dimension of the stationary cover. As shown best in FIGS. 4 and 8, the outer margins of stationary cover 63 extend out beyond the outer dimensions of junction box 15. The inner margin of stationary cover 63 (i.e., the lower margin of the stationary cover as shown in FIG. 8) is joggled, as indicated at 65, so that a flange 67 is disposed above the level of stationary cover plate 63 and above the level of the upper edge of sidewalls 21 of junction box 15. This joggle is most clearly shown in FIG. 9. As shown in FIG. 8, stationary cover 63 is provided with a pair of knock-outs 69 for securing storage heater cable 5 by means of strain relief fitting 39 to stationary cover 63. The knock-outs 69 are so located that one of them always overlies the high voltage compartment 55 which permits the heater wiring harness to always enter first the high voltage compartment which is a requirement for electrical code compliance. Additionally, stationary cover 63 is provided with apertures (not shown) which receive screws 29 which are in turn received within the threaded apertures of tabs 27 formed on the upper edges of sidewalls 21 of the junction box. In this manner, screws 29 securely fasten the stationary cover 63 to junction box 15.

Cover assembly 61 further comprises a removable cover plate 71 which is slidable on the upper surface of sidewalls 21 between a retracted position (as shown in FIGS. 8 and 9) in which the cover plate may be readily removed from or applied to the junction box and a closed position (not shown) in which the inner margin of the removable cover plate is held captive between flange 67 of stationary cover 63 and the upper edges of junction box 15. Further, removable cover 71 is provided with a pair of screw slots, as generally indicated at 73, each having an enlarged slot portion 75 and a narrow slot portion 77. These screw slots 73 are generally in register with the apertures in respective tabs 27 on junction box 15 so that with the removable cover in its retracted position, the enlarged slot portions 75 are in register with screws 29 whereby the cover may be moved toward and away from the upper edges of the junction box sidewalls with the heads of screws 29 readily passing through enlarged slot opening 75. As the removable cover is slid forwardly toward its closed position with the screws unthreaded (i.e., with the heads raised above the level of the outer face of cover plate 71), the stems of screws 29 are received in the narrow slot portions 77 and the heads of screws 29 hold the removable cover plate captive on the upper edges of the junction box. With the removable cover in its closed position, screws 29 may be tightened thereby to securely hold the removable cover in position on the open front face of the junction box.

Referring to FIG. 7, a typical wiring diagram is illustrated for a storage heater 1 as it is connected to the house wiring 11 and 13 within junction box 15 modified in accordance with kit 17 of the present invention.

While this invention has heretofore been described as a kit for adapting or modifying existing wall boxes to accept a partition thereby dividing the box into high and low voltage compartments, it will be understood that, within the broader aspects of this invention, an appliance manufacturer may supply a wiring box with a partition already installed therein together with the cover assembly 61, as heretofore described. Thus, upon installation of the appliance, the installer could substitute the wiring box supplied with the appliance having the partition installed therein for a non-conforming wiring box already installed in the wall. Then, the house and appliance wiring can be connected in the manner heretofore described.

In view of the above, it will be seen that the several objects and features of this invention are attained and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A kit installable in an electrical wall junction box so as to adapt the box to receive both high and low voltage wiring from respective high and low voltage sources and high and low voltage wiring from an appliance, to permit the connection of the high voltage wiring from said high voltage source to the high voltage appliance wiring, and to permit the connection of said low voltage wiring from said low voltage source to the low voltage appliance wiring, said junction box having a bottom, sides extending up from the bottom, and an open front, said sides and bottom of said junction box having a plurality of knock-out plates therein so as to permit entry into said junction box of said high and low voltage wirings from said high and low voltage sources via openings when selected of said knock-out plates are removed, said kit comprising a partition installable within said junction box so as to divide the interior of said junction box into a high voltage compartment and a low voltage compartment, and a cover for closing said open front of said junction box, said cover including a first cover plate securable to said box thereby to overlie a portion of said high voltage compartment and of said low voltage compartment, and having at least one knock-out plate therein so as to permit entry of said appliance high and low voltage wiring into said high voltage compartment through a common cable when one of said knock-out plates is removed, and a second cover plate removably installable on the box after said wiring connections have been made within said junction box thereby to permit inspections of said wiring connections without disturbing the wiring within said junction box, wherein said first cover plate has a flange raised out of the plane of said first cover plate above the upper edges of said side walls of said junction box when said first cover is installed on said junction box a distance sufficient to receive one margin of said second cover plate thereby to hold one margin of said second cover plate captive between said first cover plate flange and the upper edges of said junction box side walls.

2. A kit as set forth in claim 1 wherein said partition has an opening therethrough permitting the low voltage wiring from the appliance to pass through said aperture from one compartment to another so that the high voltage and low voltage connections may be made within separate compartments.

3. In an electrical junction box adapted to receive both high and low voltage wiring from respective high and low voltage sources and high and low voltage wiring from an appliance, to permit the connection of the high voltage wiring from said high voltage source to the high voltage appliance wiring, and to permit the connection of said low voltage wiring from said low voltage source to the low voltage appliance wiring, said junction box having a bottom, sides extending up from the bottom, and an open front, said sides and bottom of said junction box having a plurality of knock-out plates therein so as to permit entry into said junction box of said high and low voltage wirings from said high and low voltage sources via openings when selected of said knock-out plates are removed, a partition within said junction box so as to divide the interior of said junction box into a high voltage compartment and a low voltage compartment, and a cover for closing said open front of said junction box, wherein the improvement comprises: said cover including a first cover plate securable to said box thereby to overlie a portion of said high voltage compartment and of said low voltage compartment, said first cover plate having at least one knock-out plate therein so as to permit entry of said appliance high and low voltage wiring into said high voltage compartment through a common cable when one of said knock-out plates is removed, and a second cover plate removably installable on the box after said wiring connections have been made within said junction box thereby to permit inspections of said wiring connections without disturbing the wiring within said junction box.

4. In a junction box as set forth in claim 3 wherein said first cover plate has a flange raised out of the plane of said first cover plate above the upper edges of said side walls of said junction box when said first cover is installed on said junction box a distance sufficient to receive one margin of said second cover plate thereby to hold one margin of said second cover plate captive between said first cover plate flange and the upper edges of said junction box side walls.

5. In a junction box as set forth in claim 4 wherein said partition has an opening therethrough permitting the low voltage wiring from the appliance to pass through said aperture from one compartment to another so that the high voltage and low voltage connections may be made within separate compartments.

* * * * *